Figure 1:
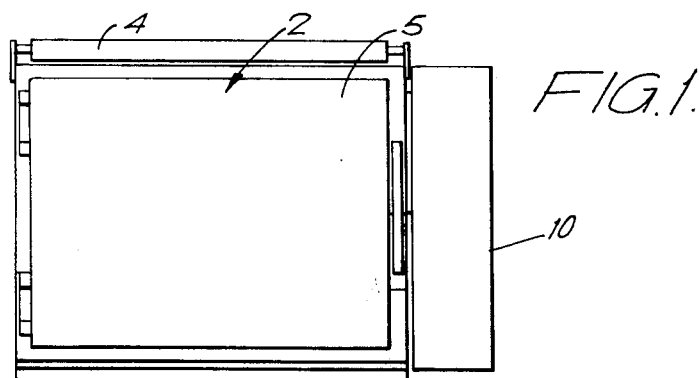

United States Patent [19]

Näykki

[11] 4,171,478
[45] Oct. 16, 1979

[54] CIRCULATING-AIR OVEN

[75] Inventor: Niilo Näykki, Helsinki, Finland

[73] Assignee: Kopal Oy, Helsinki, Finland

[21] Appl. No.: 807,157

[22] Filed: Jun. 16, 1977

[30] Foreign Application Priority Data

Jun. 24, 1976 [FI] Finland ................................. 761849

[51] Int. Cl.² ............................................. F27C 15/00
[52] U.S. Cl. ................................... 219/400; 126/21 A;
126/275 E; 219/387
[58] Field of Search ............... 219/386, 387, 390, 391,
219/392, 398, 399–400, 401, 402; 34/200, 201,
204; 312/236; 126/21 A, 275 R, 275 A, 275 E,
273; 62/237; 165/42, 59

[56] References Cited
U.S. PATENT DOCUMENTS

| 871,819 | 11/1907 | Perry | 126/275 R |
|---|---|---|---|
| 1,948,118 | 2/1934 | Klemme | 126/275 R |
| 2,439,487 | 4/1948 | Reilly | 165/42 |
| 2,851,943 | 9/1958 | Smagula | 126/275 R |
| 3,156,102 | 11/1964 | Costantini et al. | 62/237 |
| 3,261,484 | 7/1966 | Nilsson | 126/21 A |
| 3,509,870 | 5/1970 | Sheppard | 126/275 R |
| 3,861,378 | 1/1975 | Rhoads et al. | 219/400 |

Primary Examiner—Roy N. Envall, Jr.
Assistant Examiner—Bernard Roskoski
Attorney, Agent, or Firm—Friedman, Goodman & Teitelbaum

[57] ABSTRACT

A circulating air oven having a power portion which provides heat which is sent through its open front. The power portion is permanently mounted onto a pedestal which can detachably receive an oven portion. The oven portion includes a removable rear wall so that the entire rear of the oven portion can be opened up and matingly engaged with the power portion to receive the heated air. The oven portion can be detached and the rear covered whereby a heat insulating container is provided. The oven portion includes handles and other means to permit transportation of the oven portion away from the pedestal to transport and distribute food prepared in the oven portion.

3 Claims, 4 Drawing Figures

U.S. Patent  Oct. 16, 1979  4,171,478

CIRCULATING-AIR OVEN

The subject of the present invention is a circulating-air oven which comprises heating resistances, a blower, and the other functional components, as well as a heat-insulated oven space provided with a front gate or front door, for heating and baking food.

In the methods of preparation and treatment of foods so far known the foods are prepared in an oven, from which, when they are ready, they are shifted, e.g., into separate containers for cooling or for freezing, and possibly for renewed heating before their use, or only for transportation in containers to where the food is consumed.

The purpose of the present invention is to reduce the loss of heat and the time of loading, especially in respect of the last-mentioned application, and the invention is mainly characterized in that the circulating-air oven comprises a power portion of the oven, permanently mounted on a pedestal, which power portion comprises heating resistances, a blower, and the other functional components, as well as an oven space which can be placed detachably on said pedestal at the side of the power portion which is shaped as a transport box or capsule, and which oven space is, besides with a front gate or door, also provided with an openable rear wall so that, when the power portion of the oven and the transport box or capsule are connected to each other, their air spaces can be brought into straight connection with each other substantially over the entire area of the rear wall of the transport box or capsule and that, once the power portion of the oven and the oven space proper have been detached from each other, the oven space is designed so as to function as the transport box or capsule of the foods prepared therein after the rear wall of the oven space has been closed.

Figure 2:
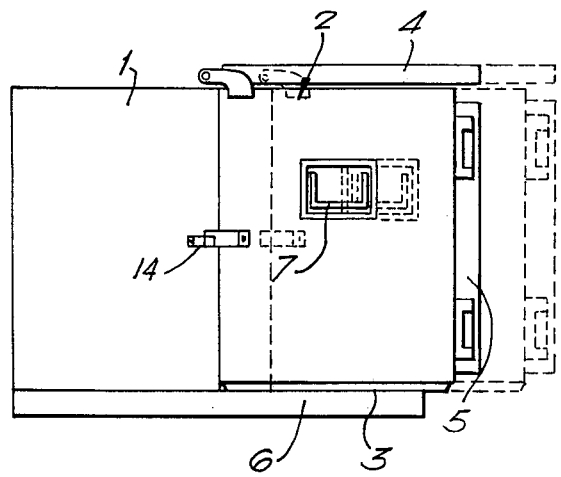
Figure 3:
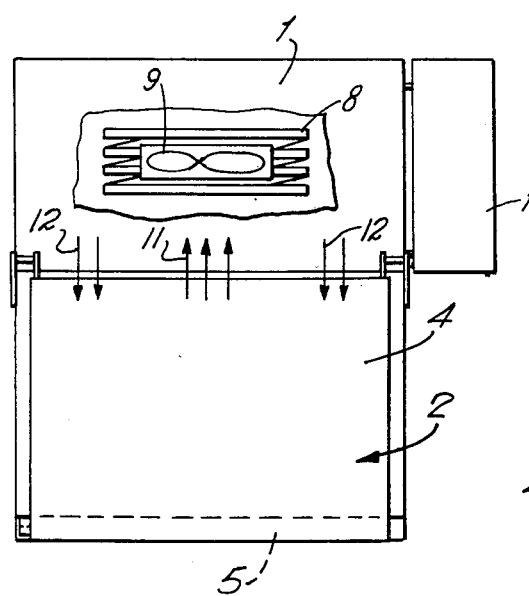
Figure 4:
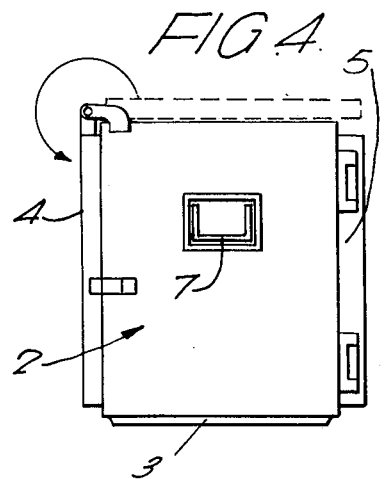

The invention comes out more closely from the following description and from the attached drawing, wherein FIG. 1 is a front view of a circulating-air oven in accordance with the invention, FIG. 2 is a side view of the oven shown in FIG. 1, FIG. 3 is a top view of the oven shown in FIG. 1, and FIG. 4 is a side view of the transport box or capsule of the circulating-air oven.

Thus, in FIGS. 1 to 3, a food transport box 2 with heat insulation, as shown in FIG. 4, is connected as a part of the circulating-air oven, wherey it, as connected to the power portion 1 of the circulating-air oven, functions as an oven.

The circulating-air oven comprises a power portion 1, which is provided with heating resistances shown schematically as the coil 8, a blower shown schematically as a fan 9, and functional components some of which are in control box 10. These components are all well known in the art. The power portion 1 is, as shown in FIGS. 1 and 2, permanently mounted onto the pedestal 6. The flow of air is such that air is sucked in the middle by the fan, as shown by the arrows 11, and heated air is blown outwardly on the sides, as shown by the arrows at 12.

The oven space 2 is formed as detachable from the power portion, and the oven space, i.e. transport box or capsule 2, comprises, as an oven normally does, a front gate or door 5, through which food is inserted into the oven, as well as an openable heat-insulated rear wall 4, which is at its upper edge hinged to the transport box or capsule so that said rear wall 4 can, for the time of the heating or baking of the food, be pivoted up against the top face of the oven space 2 as comes out from FIG. 2.

For the purpose of connecting the transport box or capsule next to the power portion 1 onto the pedestal 6, the pedestal 6 and the bottom of the transport box 2 are provided with jointly operating means, such as guides 3. Along the guides 3 it is possible to push the transport box 2 alongside the power portion 1 of the circulating-air oven. Before connecting the transport box 2 to the power portion 1, the rear wall or gate 4 of the box 2 must be lifted up in order that, during heating, the interior of the transport box 2 should be directly connected to the power portion 1 and heat is directly fed from the power portion to the oven portion. The power portion 1 and the transport box 2 are preferably provided with jointly operating locking means shown schematically at 14 so as to lock them tightly together into a circulating-air oven.

When the food is done, the box 2 is pulled along the guides 3 loose from the power portion 1, the rear wall 4 is closed (FIG. 4), and the transport box or capsule 2 with the food is ready for transportation to the food delivery. For the purpose of carrying the transport box 2, the ends of the box are provided with handles 7.

Thus, the objective of the apparatus in accordance with the invention is to reduce the loss of heat related to shifting the foods as well as the time-consuming shiftings of food. The apparatus in accordance with the invention is suitable for use especially in hospitals and comparable institutions as well as when food is shipped for example to working sites, etc.

The invention is not restricted to the above exemplifying embodiment alone, but in its details it may show variety in many ways within the scope of the patent claims.

What we claim is:

1. A circulating-air oven comprising a power portion and a detachable oven portion, said power portion comprising a housing with an open front, said housing being permanently mounted on a pedestal and comprising standard components for blowing heat through said open front; said oven portion comprising a heat insulated housing having a front door and a completely open rear section, a removable rear wall for selectively covering the entire rear section, means for detachably positioning said oven portion on said pedestal in direct side-by-side relationship with said power portion to provide a unitary oven structure, and with the entire rear section thereof directly matingly engaging the open front of said power portion whereby the heat can enter from said power portion into the interior of said oven portion through the entire area of the rear section, the heat insulated housing being in the shape of a portable transport box, and further comprising means for facilitating transport thereof, whereby when said oven portion is separated from said power portion said rear wall can cover said rear section and said oven can be utilized for transporting and distributing food prepared therein.

2. A circulating-air oven as in claim 1 and wherein said positioning means comprises cooperative guide means on said pedestal and on said heat insulated housing for slidingly positioning said oven portion alongside said power portion, and further comprising cooperative locking means on said power portion housing and on said heat insulated housing for tightly locking the oven portion to the power portion.

3. A circulatory air-oven as in claim 2 further comprising hinge means coupling said removable rear wall to the top of said rear section so that said rear wall can be positioned on top of said heat insulated housing when said oven portion is locked to said power portion.

* * * * *